April 10, 1934.    S. H. COLLOM    1,954,724
FLEXIBLE HOSE OR CONDUIT
Filed Sept. 29, 1932
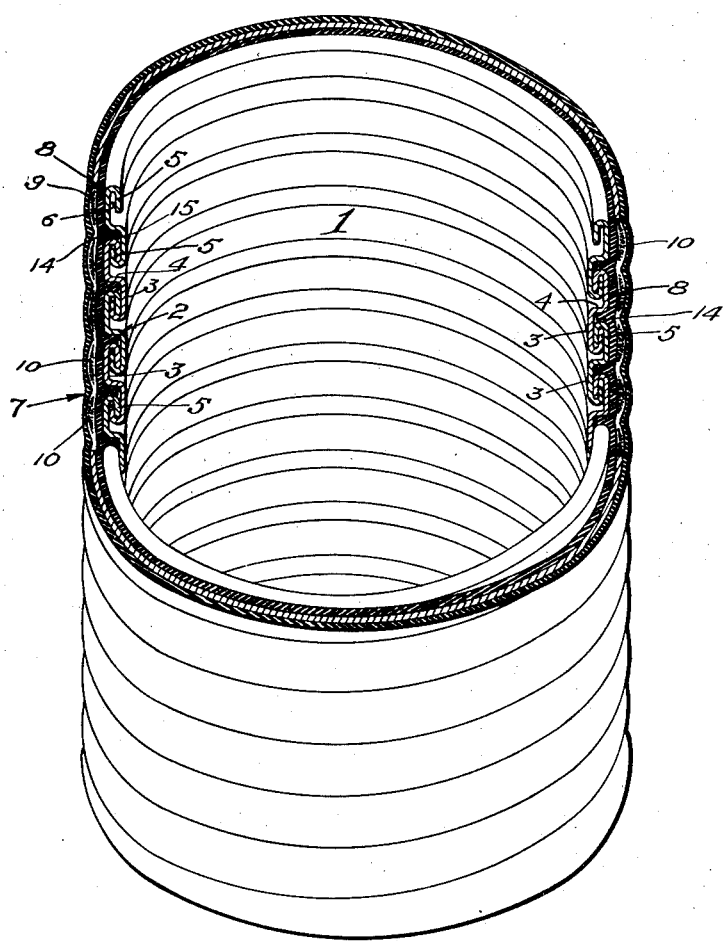
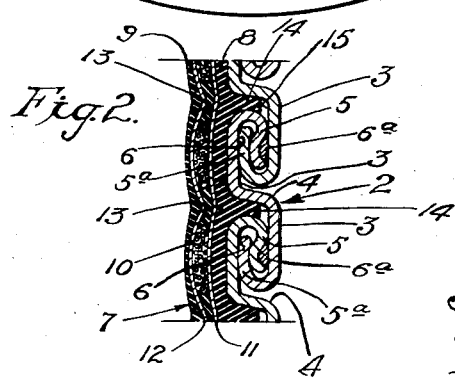
Inventor:—
Samuel H. Collom
by his Attorneys
Howson & Howson Patented Apr. 10, 1934

1,954,724

UNITED STATES PATENT OFFICE

1,954,724

FLEXIBLE HOSE OR CONDUIT

Samuel H. Collom, Philadelphia, Pa., assignor to Pennsylvania Flexible Metallic Tubing Company, Philadelphia, Pa., a corporation of Pennsylvania Application September 29, 1932, Serial No. 635,453

1 Claim. (Cl. 137—90)

This invention relates to new and useful improvements in flexible hose, tubing or the like, and has particular relation to flexible metallic conduits for conveying petroleum, its derivatives and by-products.

The principal object of the invention is to provide a flexible metallic conduit of the character set forth having an outer covering of substantially thick and strong elastic rubber which is of substantially live nature, adding to the ease of flexing the conduit.

Another object of the invention is to provide a flexible conduit of the character set forth having a wide range of flexibility, free from strain to the metal and which embodies strength and lasting qualities, not susceptible to deterioration under adverse climatic conditions.

Another object of the invention is to provide a flexible conduit of the stated character which is novelly constructed by a continuous helical winding of metal to form a completely interlocking joint availing of a sliding action intermediate the successive spirals, enhancing the degree of flexibility thereof, and maintaining a full area throughout the hose length regardless of the arc of flexibility.

Another object of the invention is to provide a flexible conduit of the character set forth which, by virtue of the rubber covering provided therefor, is rendered non-static in nature and hence, is available for use to convey substances of a volatile nature.

A more specific object of the invention is to provide a rubber covered flexible conduit having a metallic lining having corrugations formed by a succession of continuous helical windings of metal interlocked with the preceding spiral in a novel joint, preventing leakage, the said rubber covering therefor being vulcanized as one unit under pressure and forcing a portion of the rubber into the corrugations of metal tube, effecting an inseparable bond between said metal and the rubber.

Other features and details of the invention are set forth hereinafter and disclosed in the accompanying drawing, in which:

Figure 1 is a view in perspective of a section of the flexible conduit comprising the present invention having a portion thereof removed to show its structure; and Fig. 2 is an enlarged fragmentary view in section showing the detailed structure of the flexible metal conduit and the reinforced rubber covering therefor.

For the most part, flexible metallic conduits or hose for conveying petroleum, its derivatives and by-products, have not been provided or equipped with protective coverings and the outer surface of the metal hose has been exposed to contact with the elements of nature. Metallic hose of the general character described for the purpose of conveying products of the character set forth is subject, at some time or other, to deterioration, due to adverse conditions of climate, and in addition to this undesirable feature attendant upon unprotected metal hose, such hose will obviously be charged with static electricity by virtue of the contact of the metal with the ground or other statically charged element creating a substantial risk when the conduit is used to convey materials which are of a volatile nature.

By the present invention a flexible metallic conduit is provided and is equipped with a reinforced outer covering of strong, elastic, live rubber by virtue of which the metal is protected and wholly removed from contact with the elements of nature, and the said rubber coating affords an insulating means rendering the conduit non-static in nature which makes it readily adaptable for conveying volatile substances without danger or risk. Furthermore, by providing the live rubber covering on the metal conduit, it has been found that a resilient elastic effect is embodied in the conduit and permits more ready flexing thereof.

Referring now more particularly to the drawing the flexible conduit forming the subject of the present invention comprises a flexible metallic lining 1 which is formed in the present instance by a continuous helical winding of a metal strip or ribbon 2 having a substantially S-shaped cross section form, the vertical webs 3 thereof being offset from each other and in substantially parallel planes connected by a transverse portion 4. The top edge of the upper vertical web 3 is bent over inwardly with respect to the disclosure in Fig. 2 as at 5 and a space 6 is provided intermediate the bent over portion 5 and the adjacent vertical web 3. The bottom end of the lower vertical web 3 is similarly formed as at 5a, the said bottom edge being turned outwardly of the web 3 with respect to Fig. 2 in a manner substantially the same as described in connection with the inwardly turned upper edge 5, a space 6a being provided intermediate the portion 5a and the adjacent web 3.

In winding the successive helical turns of the S-shaped ribbon, or strip of metal 1, the lower or outwardly turned portion 5a is positioned in the space 6 of the preceding helical, the portion 5 of the preceding helical entering the space 6a of the succeeding helical to interlock the portions 5 and 5a, providing a substantially strong joint comprising four thicknesses of the strip and which is so constructed as to permit a sliding action intermediate the interlocking portions 5 and 5a so that a substantially wide range or great arc of flexing may be available without possible damage or strain of the metal. Asbestos packing or other material capable of effecting a seal intermediate the interlocked successive helical turns of the metallic conduit, is positioned in the recess afforded by the novel construction of the joint intermediate the downwardly extending hook portion 5 and the outer face of the portion 6a of the succeeding helical turn of the metal strip.

The present structure of the metallic conduit and the manner in which it is wound from a continuous helical winding from a strip of metal forms a corrugated outer surface therefor, and it should be particularly noted that the width and thickness and other dimensions of the S-shaped strip from which the conduit is formed have been carefully arrived at in order that the combined thickness of the joint structure at the interlocking portions of the successive strips may be in exact proportion to the width and thickness of the corrugations, thereby effecting great strength and a wide range of flexibility to the conduit. A substantially strong, elastic, rubber covering 7 is positioned on the outer surface of the metallic conduit and this covering comprises a laminated structure consisting of an inner layer of strong elastic rubber 8 and an outer layer 9 of similar material.

Positioned intermediate the cover layers 8 and 9 respectively, are spaced groups of reinforcing elements 10 of wire or the like and these are spaced from the inner and outer cover layers 8 and 9 respectively, by means of layers of canvas 11 and 12 respectively, the said groups of reinforcing wires 10 being positioned circumferentially with respect to the conduit and respectively spaced one from another by means of a filler 13 also composed of rubber or like material.

The entire hose or conduit thus built up, comprising the metallic conduit and the previously described rubber covering therefor, is vulcanized as one unit under a definite uniform pressure which acts to force a portion of the rubber into the corrugations 15 of the metal tube in the form of projecting elements 14, effecting an inseparable bond between the metal and the rubber. It should be noted that the hose unit should be vulcanized to a degree of uniform accuracy of such character that the hose covering will retain the elasticity of rubber, affording to the hose that live, resilient quality which is so desirable.

While the particular and detailed features of the invention have been set forth for descriptive purposes, it is not intended that this precise structure be not subject to change or modification within the scope of the appended claim.

What is claimed is:

In an outer covering for flexible metallic hose, an inner layer of strong, elastic material, reinforcing means comprising a number of strands of wire grouped in the form of a series of spaced convolutions surrounding said inner layer, and a filler of resilient material located in the spaces between the successive turns of said reinforcing means.

SAMUEL H. COLLOM.